United States Patent [19]

Takeda

[11] Patent Number: 4,936,275

[45] Date of Patent: Jun. 26, 1990

[54] IGNITION CONTROL DEVICE FOR INTERNAL COMBUSTION ENGINE WITH PREDICTION OF TIMING RATIO

[75] Inventor: Yuji Takeda, Toyota, Japan

[73] Assignee: Toyota Jidosha Kabushiki Kaisha, Toyota, Japan

[21] Appl. No.: 379,205

[22] Filed: Jul. 13, 1989

[30] Foreign Application Priority Data

Jul. 13, 1988 [JP] Japan ............................ 63-174498

[51] Int. Cl.$^5$ ............................................. F02P 5/00
[52] U.S. Cl. ................................... 123/417; 123/419
[58] Field of Search ............... 123/406, 416, 417, 418, 123/419, 425

[56] References Cited

U.S. PATENT DOCUMENTS

| | | | |
|---|---|---|---|
| 4,616,617 | 10/1986 | Geiger et al. | 123/419 |
| 4,690,122 | 9/1987 | Sasakura et al. | 123/417 |
| 4,741,310 | 5/1988 | Yagi et al. | 123/416 |
| 4,748,952 | 6/1988 | Yagi et al. | 123/417 |
| 4,759,327 | 7/1988 | Nagano et al. | 123/419 |
| 4,799,469 | 1/1989 | Nagano et al. | 123/419 |
| 4,809,664 | 3/1989 | Nakamoto et al. | 123/419 |
| 4,825,832 | 5/1989 | Satoh et al. | 123/425 |
| 4,841,932 | 6/1989 | Hansen et al. | 123/417 |
| 4,848,299 | 7/1989 | Satoh et al. | 123/417 |

FOREIGN PATENT DOCUMENTS 57-195867 12/1982 Japan.
60-104771 6/1985 Japan.
60-108565 6/1985 Japan.

*Primary Examiner*—Raymond A. Nelli
*Attorney, Agent, or Firm*—Cushman, Darby & Cushman

[57] ABSTRACT

In an electronic ignition control device which operates based upon a sawtooth shaped crankshaft rotation position signal with conversion of the sawtooth shaped signal into an on/off pulse signal; a ratio of on or off duration of the on/off pulse signal to a cycle time span thereof is used to predict a next top dead center and to determine the ignition timing thereupon.

5 Claims, 5 Drawing Sheets

IGNITION CONTROL DEVICE FOR INTERNAL COMBUSTION ENGINE WITH PREDICTION OF TIMING RATIO

BACKGROUND OF THE INVENTION

1. Field of the Invention

The present invention relates to an ignition control device for an internal combustion engine of a vehicle such as an automobile, and more particularly, to an electronic ignition control device for controlling the ignition timing of each cylinder with a computing prediction of the ignition timing based upon a ratio in timing cycles.

2. Description of the Prior Art

It is already known to control the ignition timing of an internal combustion engine of a vehicle such as an automobile by an electronic ignition control device so as to determine the timing of starting and stopping supply of electric current to an ignition coil according to an electronic computing based upon a sawtooth shaped crank position signal available from am electromagnetic pickup type rotation sensor. The sawtooth shaped signal available by such rotation sensor is generally converted into an on/off pulse signal by a comparator according to a comparison with a threshold signal level. Such a sawtooth shaped signal generally has a wave characteristic that it falls relatively steeply and rises relatively moderately in each cycle, and the time point at which the on/off pulse signal produced from such a sawtooth shaped signal turns off is highly definite but the time point at which the on/off pulse signal turns on is relatively indefinite. When the engine is operating at a relatively constant speed, it may be enough to use only the turn off information in the on/off pulse signal for controlling the ignition timing. However, when the engine is changing its rotational speed, the time span between two adjacent such turn off time points is not short enough to obtain high quality control of the ignition timing to catch up with a change of the engine speed. Therefore, it is conventional in the electronic ignition control systems to use both the turn on and the turn off information in such an on/off pulse signal for controlling the ignition timing, as in the systems disclosed, for example, in Japanese Patent Laying Open Publication Sho 57-195867 (1982), Japanese Patent Laying Open Publication Sho 60-104771 (1985), and Japanese Patent Laying Open Publication Sho 60-108565 (1985).

On the other hand, since the timings for ignition, i.e. the time points at which the supply of electric current to the ignition coil is started and stopped occur before each corresponding compression stroke of the cylinder is completed, there things need to be predicted for each ignition cycle based upon the preceding cycle times of the cylinder strokes so as to catch up with a variation of the engine rotational speed. In the conventional electronic ignition control devices a modification for each next ignition timing to catch up with a variation of the engine rotational speed is made by addition or subtraction of a certain small time difference obtained from the changes in the cycle times in the preceding engine cycles.

However, since a shifting of the turn on time point with respect to the turn off time point in the on/off pulse signal is different in each cylinder, and since the time difference to be added or subtracted changes according to the degree of acceleration or deceleration of the engine, it is difficult to predict the ignition timing to be always optimum for all cylinders.

SUMMARY OF THE INVENTION

The object of the present invention is to provide an improved ignition timing control device which can highly accurately predict each next ignition timing for each cylinder of an internal combustion engine even under high rate changing of engine rotation speed.

The above objective is accomplished according to the present invention by an ignition control device for an internal combustion engine, comprising:

a first means for generating a position signal which falls and rises with a cycle corresponding to a crank angle rotation corresponding to 720°/number of cylinders for each cylinder;

a second means for calculating a time span corresponding to 720°/number of cylinders between each two successive time points of either the falling or the rising of said position signal for each cylinder;

a third means for calculating a ratio of a time span between each two successive time points of either the rising and the falling or the falling and the rising of said position signal to said time span corresponding to 720°/number of cylinders for each cylinder;

a fourth means for predicting a partial time span between next two successive time points of either the rising and the falling of said position signal or the falling and the rising of said position signal based upon multiplication of said time span corresponding to 720°/number of cylinders with said ratio for each cylinder;

a fifth means for predicting a time point for starting supply of electric current to an ignition coil based upon prediction of a next time point of either the falling or the rising of said position signal according to said time span corresponding to 720°/number of cylinders; and a sixth means for predicting a time point for stopping the supply of electric current to the ignition coil based upon a last time point of either the rising or the falling of said position signal and said partial time span.

The ratio of a time span between each two successive time points of either the rising and the falling or the falling and the rising of said position signal to the time span corresponding to 720°/number of cylinders for each cylinder was found to have a high reproducibility in each cylinder. Therefore, by using this ratio as a parameter for predicting the end of the cycle period, the next top dead center relative to which the ignition timing, i.e. the time point at which the supply of electric current to the ignition oil is to be cut off is to be advanced by an ignition advance angle can be predicted at high accuracy according to the last and newest time span corresponding to 720°/number of cylinders. Such a ratio may desirably be learned and renewed every time when the ignition control is carried out for each cylinder.

When said position signal is a sawtooth shaped signal which falls relatively steeply and rises relatively moderately, said second means may calculate said time span corresponding to 720°/number of cylinders to be between each two successive time points of the falling of said position signal.

In this case, said third means may calculate said ratio as a ratio of a time span between each two successive time points of the rising and the falling of said position signal to said time span corresponding to 720°/number of cylinders.

Said fifth means may predict said time point for starting supply of electric current to the ignition coil by subtracting a time span corresponding to an advance angle for ignition and a time span corresponding to a duration of the supply of electric current to the ignition coil from said predicted next time point of either the falling or the rising of said position signal.

Further, said sixth means may predict said time point for stopping the supply of electric current to the ignition coil by advancing time from said last time point of either the rising or the falling of said position signal as much as said partial time span and then delaying therefrom a time span corresponding to an advance angle for ignition.

BRIEF DESCRIPTION OF THE DRAWINGS

In the accompanying drawings.

DESCRIPTION OF THE PREFERRED EMBODIMENT

The present invention will now be described in detail with respect to a preferred embodiment thereof with reference to the accompanying drawings.

Figure 1:
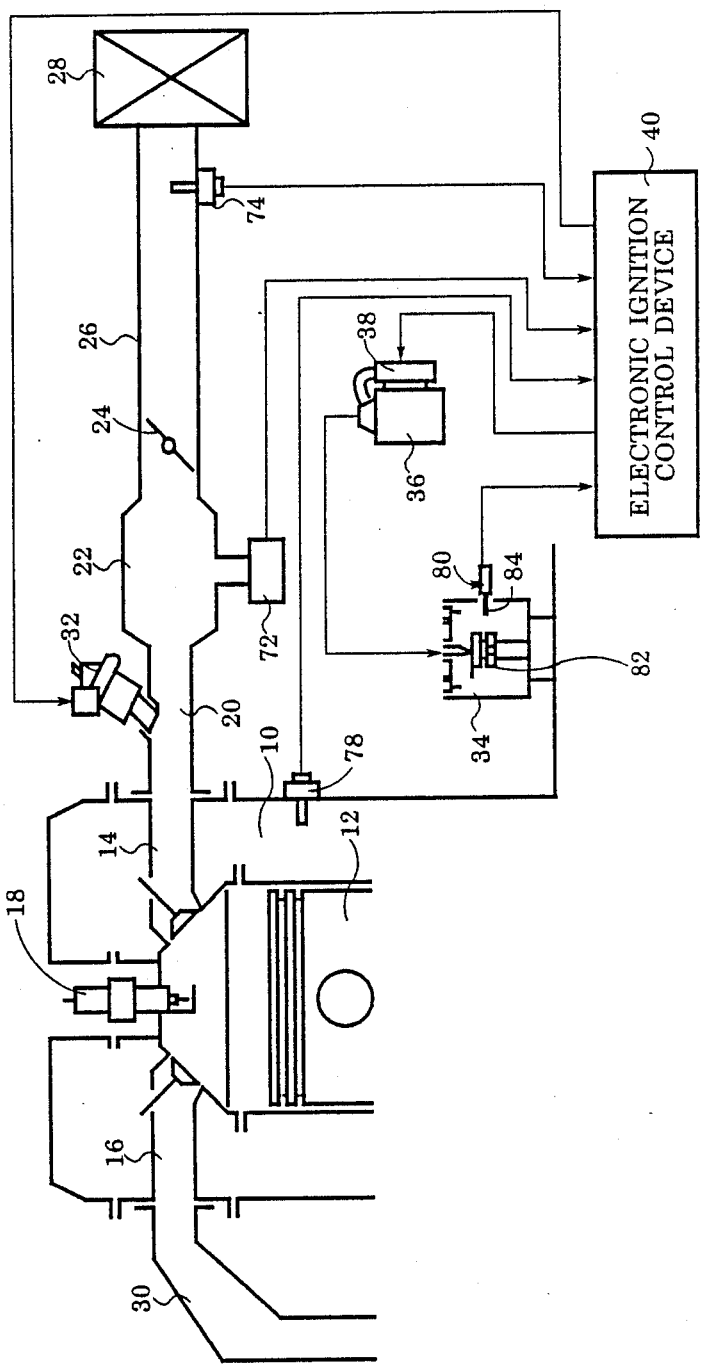
FIG. 1 is a diagrammatical illustration of the fuel combustion system of an internal combustion engine equipped with an embodiment of the electronic ignition timing control device according to the present invention.

Referring to FIG. 1 showing an example of an internal combustion engine fitted with the ignition timing control device according to the present invention, an engine 10 schematically shown for one of the cylinder head portions of a multi-cylinder type engine has a piston 12, an inlet port 14, an exhaust port 14, and a spark plug 18. The inlet port 14 is connected with an intake system including an inlet manifold 20, a surge tank 22, a throttle valve 24, an inlet tube 26, and an air cleaner 28. An exhaust port 16 is connected with an exhaust manifold 30.

The inlet manifold 20 is fitted with a fuel injector 32 for each cylinder. The fuel injector 32 is operated by a control signal from an electronic ignition control device 40 including a microcomputer, and injects a fuel such as gasoline to each cylinder.

The spark plug 18 is also provided individually for each cylinder, and an ignition voltage from an ignition coil 36 is supplied to the spark plug 18 for each cylinder in a certain firing order by a distributor 34. The ignition coil 36 is supplied with a primary current which is interrupted by an igniter 38 which is a transistor type ignition device of a conventional construction, and supplies a high ignition voltage at a certain timing through the distributor 34 to the spark plug 18.

The igniter 38 is operated by a control signal from the electronic ignition control device 40, and carries out control of the supply of electric current to the ignition coil 36.

Figure 2:
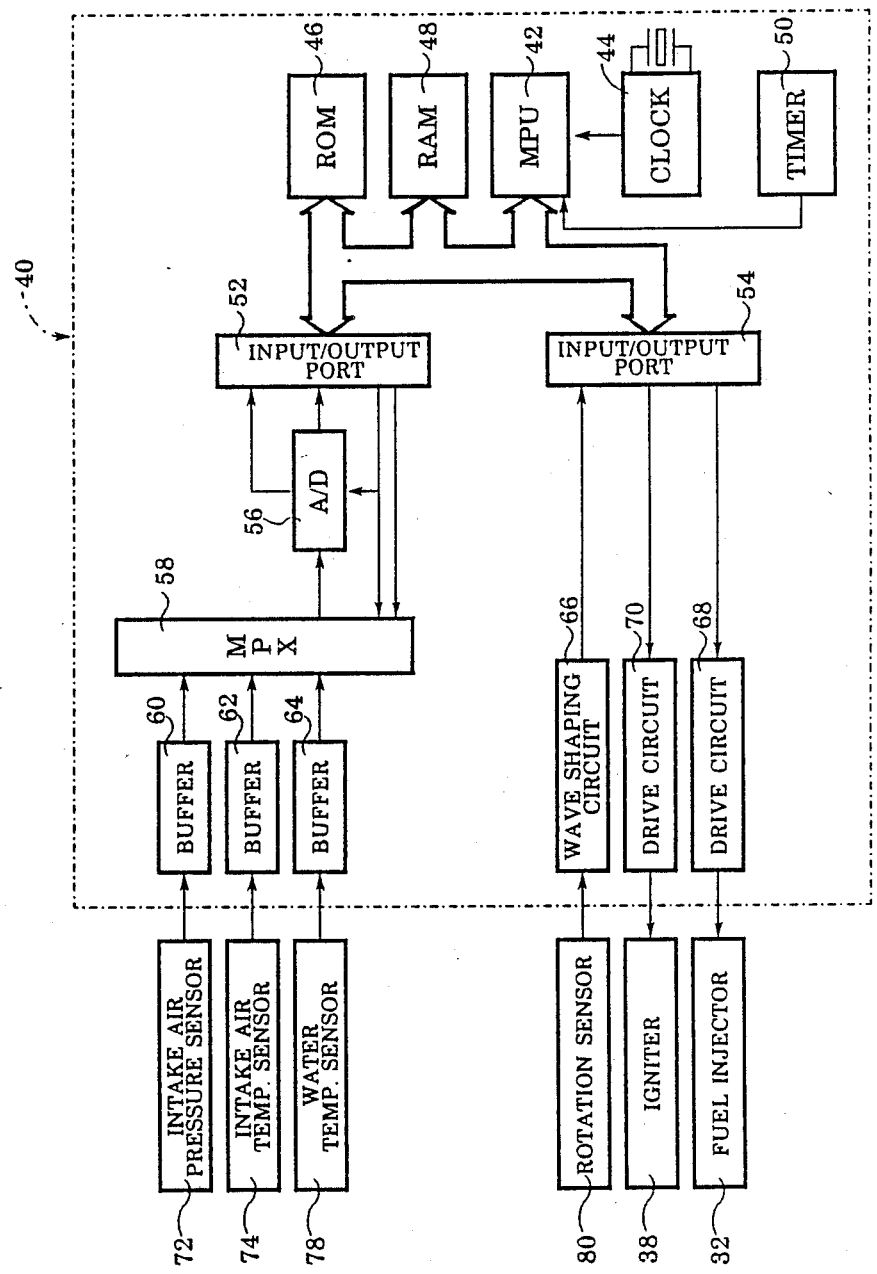
FIG. 2 is a block diagram showing an embodiment of the electronic ignition timing control device according to the present invention.

The electronic ignition control device 40 has, as shown in FIG. 2, a microprocessor unit (MPU) 42, a clock generator circuit 44, a read only memory (ROM) 46, a random access memory (RAM) 48, a timer 50, input/output port means 52 and 54, an analog/digital converter 56, a multiplexer 58, three buffer circuits 60, 62 and 64, a wave shaping circuit 66, and two drive circuits 68 and 70.

The buffer circuit 60 is connected with an intake air pressure sensor 72 and provides information relating to the intake air pressure to the multiplexer 58; the buffer circuit 62 is connected with an intake air temperature sensor 74 and provides information relating to the intake air temperature to the multiplexer 58; and the buffer circuit 64 is connected with a water temperature sensor 78 and provides information relating to the cooling water temperature of the engine to the multiplexer 58. These data signals are converted from analog to digital by the analog/digital converter 56, and are input to the input/output port 52.

The wave shaping circuit 66 is a conventional wave shaping circuit, including a comparison circuit; it is supplied with a sawtooth shaped position signal such as shown in FIG. 4(a) from a rotation angle sensor 80, shown in FIG. 1, having an electromagnetic coil means 84 and sensing each particular crank angle position for each cylinder from a rotor 82 which has a number of tooth portions corresponding to the number of cylinders of the engine and rotates in accordance with rotation of the crankshaft of the engine at a half speed thereof as fitted to a rotor shaft of the distributor 34. Since in this embodiment there are four cylinders there are four tooth portions in the rotor 82. The sawtooth shaped crank angle position signal forms a complete cycle for every angle corresponding to 720°/number of cylinders, which, in this embodiment, is 180°, of crankshaft rotation.

The wave shaping circuit 66 makes a comparison of the sawtooth shaped signal from the rotation angle sensor 80 with a threshold signal level, and as shown in FIG. 4(b) forms an on/off pulse signal; this pulse signal is output to the input/output port 54.

The MPU 42 generates a control signal for the fuel injector 32 based on the above various data, and outputs this signal to the fuel injector 32 through the drive circuit 68; it also calculates an ignition timing and outputs ignition current starting and stopping commands as shown in FIG. 4(c) to the igniter 38 through the drive circuit 70.

Figure 3:
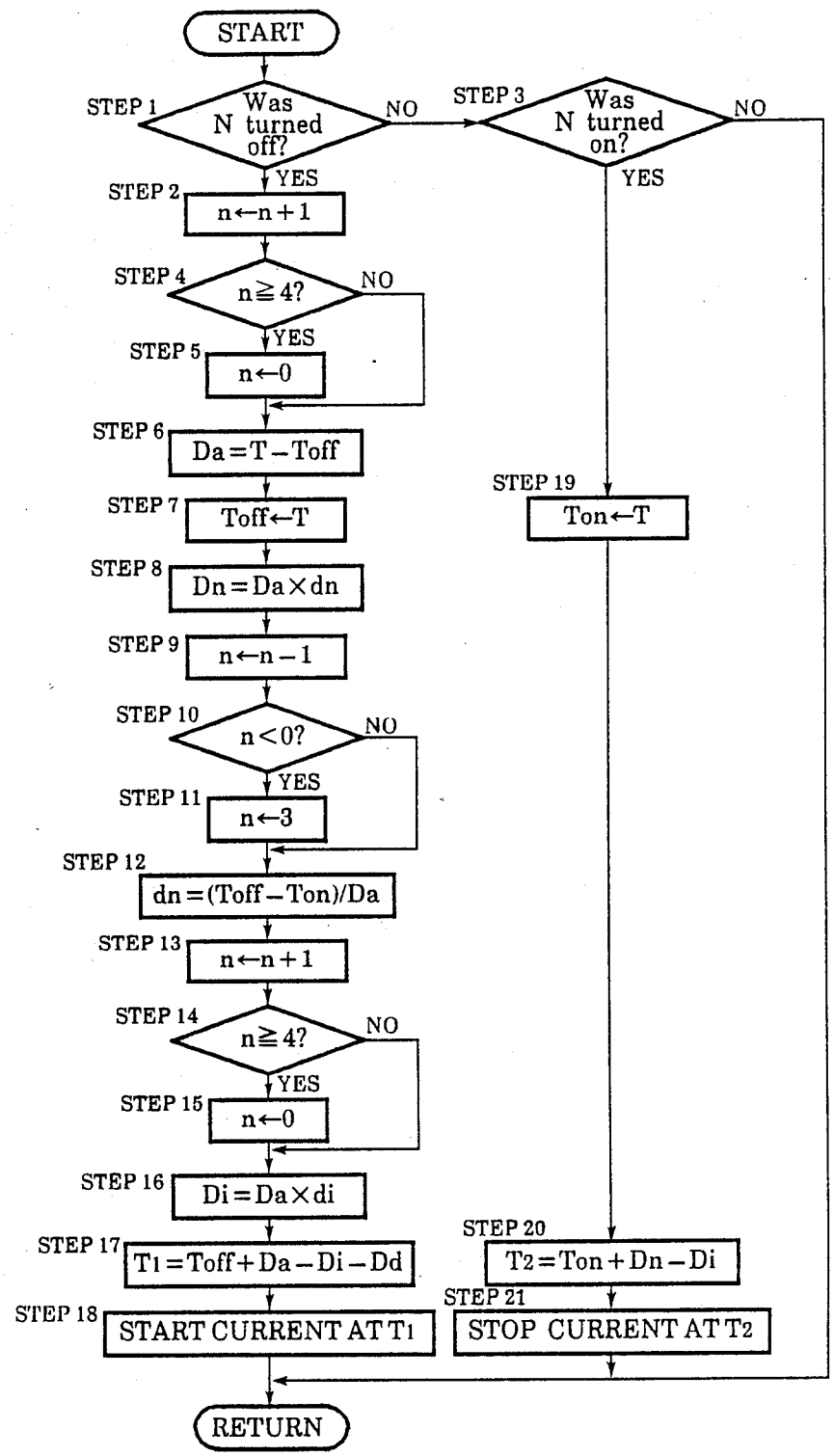
FIG. 3 is a flow chart showing the operation of an embodiment of the electronic ignition timing control device according to the present invention.
Figure 4:
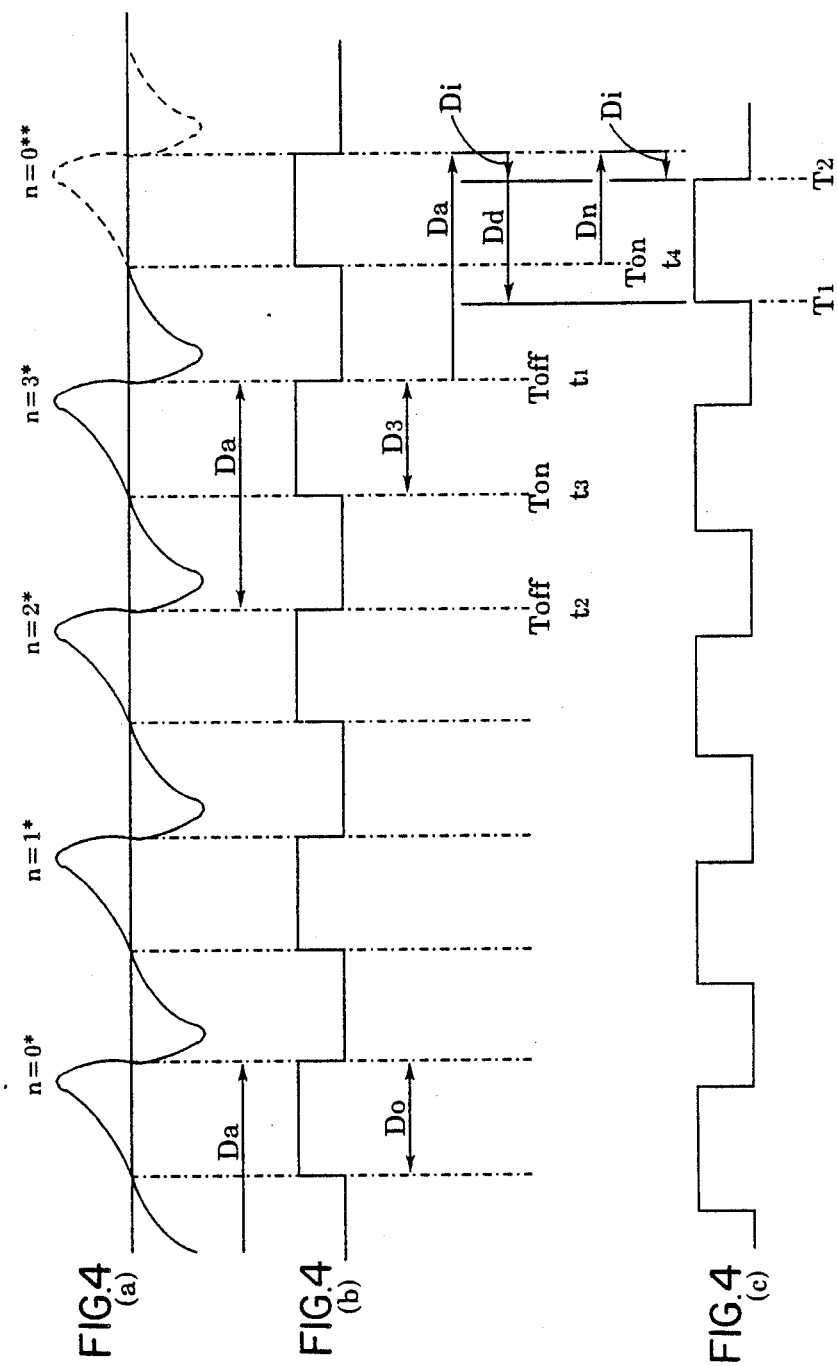
FIG. 4 is a timing chart showing the operation of the electronic ignition timing control device according to the present invention.

The construction as a system of the ignition control device according to the present invention will be described in the form of a flow chart showing the operation thereof with reference to FIG. 3 and also to FIG. 4 showing the progress of signals handled by the ignition control device.

Here it is assumed that the engine has four cylinders which will be generally identified by number "n" which can be either "0", "1", "2" or "3", and that the four cycle power generating operation of the engine is carried out by the four cylinders in succession according to the order of cylinders "0", "1", "2" and "3". Further, it is also assumed that the control process has just finished four cycles with respect to cylinders "0" to "3" designated by "0*", "1*", "2*" and "3*" in FIG. 4 before starting again the control process according to the flow chart in FIG. 3. Therefore, the following processes are for a compression stroke of cylinder "0" designated by "0**" in FIG. 4.

Now, in step 1 in the flow chart, it is checked if the on/off pulse signal N shown in FIG. 4(b) was just turned off. If the answer is "yes" the control process proceeds to step 2, but if the answer is "no" the control process proceeds to step 3.

In steps 2, 4 and 5 the register address prepared separately for the four cylinders is advanced to the next, that is, "n" is changed from "3" to "0" to designate the register for cylinder "0".

In step 6 a calculation is made to subtract a time T off currently stored in a common register from the current time T, whereby the cycle time Da for 180° crank angle rotation in the compression stroke of cylinder "3*", i.e. the newest information of 180° crankshaft rotation time span, is obtained. When viewed in FIG. 4, T is t1, Toff is t2, and Da is t1-t2. After the above calculation, in step 7, Toff in the common register is renewed to the newest Toff, i.e. t1. Then the process proceeds to step 8.

In step 8, the "on" duration Dn of the on/off signal in the compression stroke of cylinder "0**" is predicted based upon the above Da with multiplication of a factor dn currently stored in the register for cylinder "n", i.e. "0". The factor dn was obtained int eh last control cycle for cylinder "1", i.e. "1*" just as dn for cylinder "3*" is obtained in step 12 described hereinunder. Then the process proceeds to step 9.

In steps 9-11 the cylinder number n is retrogressed by one to, in the present case, cylinder "3", i.e. "3*". Then next, in step 12, the multiplying factor dn for predicting the "on" duration of the on/off signal is obtained for cylinder "3"("3*") for the next use in the next control of cylinder "3" by subtracting the time value currently stored in the common register for Ton, i.e. t3 detected in the last control for cylinder "3"("3*"), from the time value currently stored in the common register for Toff, i.e. t1, and dividing the difference, i.e. D3, by Da. It will now be noted that the value of the value of dn used in the above step 8 was obtained in the same manner in the last control process for cylinder "1*" as Do/Da. Then, in steps 13-15 the numeral n is returned to the current number, i.e. "0"("0**").

Next, in step 16 a duration Di corresponding to the advance angle for ignition is calculated based upon the current Da with multiplication of a factor di which is read out from the ROM 46 where it is stored as predetermined for a desired performance of the engine. Then, in step 17 the timing T1 for starting the supply of ignition current to the ignition coil 38 is predicted by advancing the time from the current Toff, i.e. t1, as much as Da, and then returning therefrom as much as Di and further as much as a duration Dd which is read out from the ROM 46 where it is stored as a predetermined duration for supplying current to the ignition coil required to obtain a desired performance of the ignition coil in view of the electromagnetic inertia thereof, etc.. Then, in step 18, at the thus obtained time point T1, the supply of current to the ignition coil is started. Then the process returns for recycling.

For the time being the process will proceeds through step 1 to step 3 and then through step 3 directly to return because the answer in step 1 is now "no" and further the answer in step 3 where it is checked if the on/off signal N was just turned on will be also "no" until the time reaches time point t4. When the on/off signal N turns on at time point t4, then the process proceeds to step 19.

In step 19 the current time is stored in the common register for Ton. Then the process proceeds to step 20.

In step 20 the ignition time, i.e. the time point T2 at which the ignition current supplied to the ignition coil is stopped or cut off to generate a high voltage for firing the spark plug 32 is predicted by advancing time from the current time Ton, i.e. t4, as much as Dn to predict the next top dead center time point and then returning therefrom as much as Di. Then next, in step 21, the current which has been supplied since time point T1 is stopped. Then the control process returns for recycling.

Figure 5:
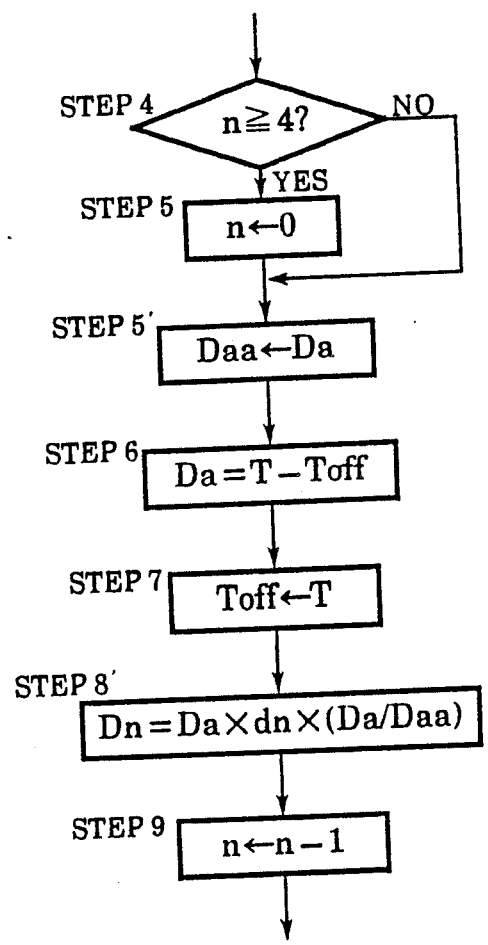
FIG. 5 is a flow chart showing a modification of the operation of the electronic ignition timing control device shown in FIG. 3.

FIG. 5 shows a modification of the flow chart shown in FIG. 3. According to this modification, before the time span Da of cylinder "3*" is calculated in step 6, in step 5' the time span Da of cylinder "2*" stored in the common register is transferred to another common register as Daa, and the calculation for Dn in step 8 is modified as in step 8' by a further multiplication of factor Da/Daa. By this modification the current tendency of changing of engine rotational speed is more deliberately caught up with.

Although in the embodiment shown in FIG. 3 and the modification shown in FIG. 5 the time point for starting the supply of electric current to the ignition coil is calculated from the time point Toff while the time point for stopping the supply of electric current to the ignition coil is calculated from the time point Ton, these relations may be reversed with a corresponding modification of the structure of the rotation angle sensor so that the time point for starting the supply of electric current to the ignition coil is calculated from the time point Ton while the time point for stopping the supply of electric current to the ignition coil is calculated from the time point Toff under the prediction of Dn which, in this case, should be the time span of the turn off state of the on/off pulse signal.

Further, although in the embodiment shown in FIG. 3 and the modification shown in FIG. 5 the time point of starting the supply of electric current to the ignition coil is predicted based upon Toff (t1), if the start of supply of the electric current to the ignition coil may be later than Ton (t4) according to the characteristics of the ignition coil such as the electromagnetic inertia or the like, the time point for starting the current supply may also be calculated from Ton.

Although the invention has been described with respect to a particular embodiment and a modification thereof, it will be apparent to those skilled in the art that various other embodiments and/or modifications are possible without departing from the spirit of the present invention.

I claim:
1. An ignition control device for an internal combustion engine, comprising:
   a first means for generating a position signal which falls and rises with a cycle corresponding to a crank angle rotation corresponding to 720°/number of cylinders for each cylinder;
   a second means for calculating a time span corresponding to 720°/number of cylinders between each two successive time points of either the falling or the rising of said position signal for each cylinder;
   a third means for calculating a ratio of a time span between each two successive time points of either the rising and the falling or the falling and the rising of said position signal to said time span corre- sponding to 720°/number of cylinders for each cylinder;

a fourth means for predicting a partial time span between next two successive time points of either the rising and the falling of said position signal or the falling and the rising of said position signal based upon multiplication of said time span corresponding to 720°/number of cylinders with said ratio for each cylinder;

a fifth means for predicting a time point for starting supply of electric current to an ignition coil based upon prediction of a next time point of either the falling or the rising of said position signal according to said time span corresponding to 720°/number of cylinders; and a sixth means for predicting a time point for stopping the supply of electric current to the ignition coil based upon a last time point of either the rising or the falling of said position signal and said partial time span.

2. An ignition control device according to claim 1, wherein said position signal is a sawtooth shaped signal which falls relatively steeply and rises relatively moderately, and said second means calculates said time span corresponding to 720°/number of cylinders to be between each two successive time points of the falling of said position signal.

3. An ignition control device according to claim 2, wherein said third means calculates said ratio as a ratio of a time span between each two successive time points of the rising and the falling of said position signal to said time span corresponding to 720°/number of cylinders.

4. An ignition control device according to claim 1, wherein said fifth means predicts said time point for starting supply of electric current to the ignition coil by subtracting a time span corresponding to an advance angle for ignition and a time span corresponding to a duration of the supply of electric current to the ignition coil from said predicted next time point of either the falling or the rising of said position signal.

5. An ignition control device according to claim 1, wherein said sixth means predicts said time point for stopping the supply of electric current to the ignition coil by advancing time from said last time point of either the rising or the falling of said position signal as much as said partial time span and then delaying therefrom a time span corresponding to an advance angle for ignition.

* * * * *